United States Patent Office 3,264,134
Patented August 2, 1966

3,264,134
POLYURETHANE LATEX CONTAINING A WATER SOLUBLE ALCOHOL
John J. Vill, Wheaton, and Stuart P. Suskind, Laurel, Md., assignors to W. R. Grace & Co., New York, N.Y., a corporation of Connecticut
No Drawing. Filed Apr. 13, 1964, Ser. No. 359,477
10 Claims. (Cl. 117—63)

The present invention relates to the production of vapor permeable films, and more specifically to novel polyurethane films which possess a high degree of water permeability.

It is well known that polyurethane films possess a high degree of durability. These films are frequently used where a high degree of scuff resistance, flexibility and chemical inertness is required. It is also found that films and coatings prepared from polyurethane resins possess a high degree of moisture impermeability.

For numerous applications, the inherent moisture impermeability of polyurethane films is used to great advantage. However, for certain uses such as coatings for synthetic leather and other materials which require the ability to "breathe" polyurethane resins have not been found to be suitable.

Attempts have been made to increase the vapor permeability of synthetic coatings and films, particularly those coatings and films used in synthetic leather products, by mechanical perforation of the polymeric coatings used in building up the product. To date, these perforation techniques have been unsatisfactory, both from the standpoint of effectiveness, appearance and economy. To mechanically perforate a continuous polymeric coating, so as to substantially increase its vapor permeability, without deleteriously altering its strength and appearance characteristics, has proven difficult.

It is therefore an object of the present invention to provide polyurethane films and coatings which possess a high degree of moisture permeability.

It is another object to provide novel polyurethane film-forming and coating compositions from which moisture permeable films and coatings may be readily prepared.

It is a further object to provide novel polyurethane coatings for synthetic leather and like products which possess the desired characteristics of toughness, scuff resistance, flexibility and mechanical strength combined with a high degree of moisture permeability.

It is another object to provide a method for preparing moisture permeable polyurethane coatings and films which does not require the mechanical perforation or alteration of said films.

These and still further objects of the present invention will become readily apparent to one skilled in the art from the following detailed description and specific examples.

Broadly, the present invention contemplates highly moisture permeable films and coatings which are prepared by admixing a minor amount of a polyhydroxy alcohol with a polyurethane aqueous emulsion, forming a desired film structure of the emulsion, and extracting the polyhydric alcohol from the formed film.

More specifically, we have found that when a polyhydroxy alcohol is solvent extracted from a deposited film of a polyurethane emulsion, which contains the alcohol, a highly permeable film is formed. These films possess a vapor permeability which is many times that of films formed from similar polyurethane emulsions which do not contain the polyhydroxy alcohol which is subsequently extracted.

OVERALL COMPOSITION

The resin compositions from which the present vapor permeable structures are formed contain three primary ingredients: (1) a water emulsifiable, polyurethane resin; (2) water, which serves as a dispersing medium; and (3) a polyhydroxy alcohol, which is subsequently extracted from the film. These three ingredients are combined in the following ratios: (1) polyurethane resin from about 25 to about 70 parts by weight; (2) water from about 75 to about 30 parts by weight; and (3) polyhydroxy alcohol from about 1 to about 20 parts by weight. These ingredients are blended and intimately admixed so as to provide a stable dispersion of the polyurethane resin in the water-polyhydroxy alcohol medium. The mixing procedure is carried out so that the polyurethane particles which are dispersed in the medium have a size of from about 0.1 to about 10.0 microns.

EMULSIFIABLE POLYURETHANES

The emulsifiable polyurethane resins which may be used in the practice of the present invention, include any polyurethanes which are dispersed in water. Thus, polyurethanes which are dispersed by means of auxiliary surface active or emulsifying agents are suitable. Such compositions are well known to those skilled in the art and are typically disclosed in U.S. Patent 2,968,575 to James E. Mallonee, dated January 17, 1961.

Another type of emulsifiable polyurethanes which are the preferred compositions used in the present invention, are broadly described as water-emulsifiable, high molecular weight polyurethanes, which are characterized by containing at least about 0.1% by weight of tertiary amino nitrogen, the tertiary amino nitrogen being substantially neutralized with an acid.

These preferred compositions are formed by reacting a polyhydroxy tertiary amine with an isocyanate terminated prepolymer to obtain an extended polyurethane polymer of desirable molecular weight, and subsequently neutralizing the tertiary amine group resin in the extended polyurethane chain with an acid to create hydrophilic substituents therein. These polyurethane polymers are readily emulsifiable in water without the use of auxiliary surfactants or emulsifications agents and are particularly suitable for practice in the present invention.

A typical method for preparing these preferred polyurethane polymers is outlined by the following equations:

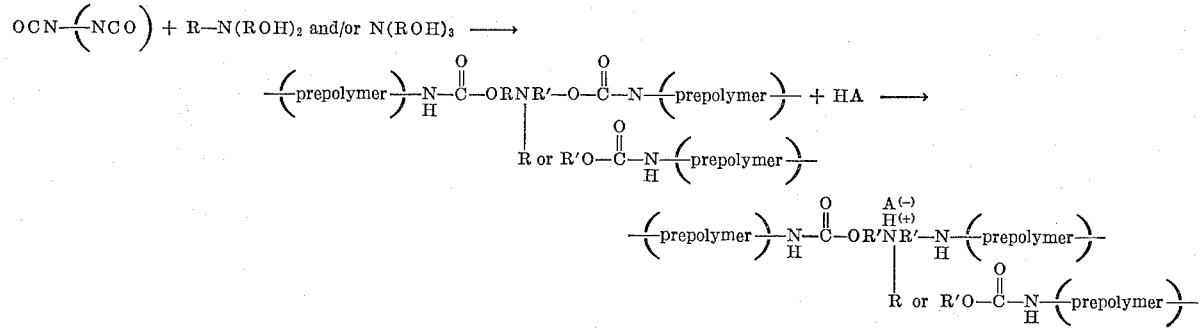

wherein R and R′ represent hydrocarbon radicals and A is an acid anion.

In the above equation, the term "prepolymer" as shown in brackets is initially terminated with isocyanate groups and is intended to include any polymeric polyurethane building unit, i.e. block.

These so called "block" polymeric units may be formed by numerous means using many different starting materials. Frequently, they take the form of polyester, polyether, and polyglycol "prepolymers" having a molecular weight of from about 500 to about 3,000. In the case of polyesters, polyethers and polyglycol prepolymers the initial block or starting material is hydroxy terminated, and subsequently, the hydroxy terminated block is reacted with an excess of polyisocyanate so as to provide active isocyanate groups in the terminal positions. The formation of various types of prepolymer units which may be used in the practice of the present invention may be illustrated as follows.

I. Polyester prepolymer:

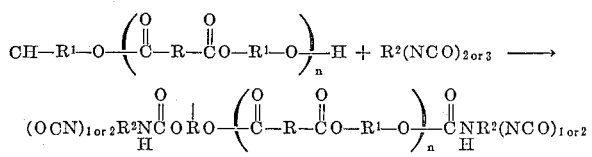

wherein *n* as a value of from 2 to about 8.

I. In the above equation R, R¹, and R² represents organic hydrocarbon and oxy interrupted hydrocarbon radicals which are present in the initial difunctional acids, alcohols and isocyanates used in the formation of the polyester prepolymer. These organic acids, alcohols and isocyanates may be selected from any of the prior art materials which have been used to form conventional polyurethanes. Typical examples of R are alkylene and alkenylene having from about 2 to 36 carbon atoms, and phenylene. These hydrocarbon residues are present in oxalic, adipic and dimerized linoleic acids.

R¹ represents alkylene having from about 2 to 8 carbon atoms, and dialkylene ether, ⟨alkylene-O-alkylene⟩, wherein the alkylene radicals possess from about 2 to 8 carbon atoms. These radicals are derived from alcohols such as ethylene glycol, 1,3-butylene glycol, and ethoxyethyldiol.

R² is a difunctional or trifunctional isocyanate residue and may be lower alkyl phenylene,

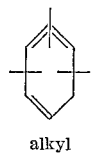

alkyl wherein the alkyl group has 1 to 4 carbon atoms, diphenylmethane,

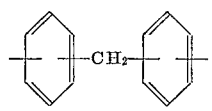

triphenylenemethane

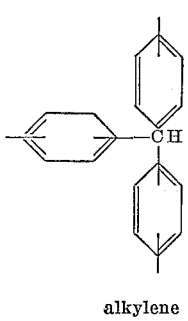

alkylene having 4 to 8 carbon atoms, lower alkyl and alkoxy diphenylene,

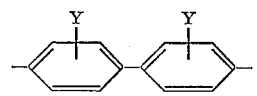

wherein Y represents alkyl and alkyoxy having 1 to 4 carbon atoms, and dialkylenebenzene,

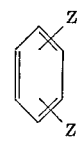

wherein Z represents alkylene radicals having 1 to 4 carbon atoms. Typical polyfunction isocyanates from which the above hydrocarbon residues may be derived are 2,4- and 2,6-toluene diisocyanate, triphenylmethane triisocyanate, hexamethylene diisocyanate, tolidene diisocyanate, dianisidine diisocyanate, and m-xylene diisocyanate.

Other suitable ester type materials from which isocyanate terminated prepolymers may be derived are castor oil and polyester glycols derived from caprolactone. Furthermore, the ester prepolymers may be crosslinked by incorporating a triol such as glycerine or trimethylolpropane.

II. Polyether prepolymer:

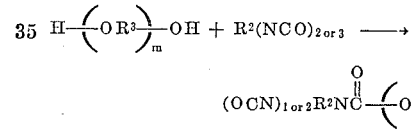

wherein *m* has a value of from 10 to about 60 and R² has the meaning given in I above.

In the above polyether prepolymer R³ may represent both straight and branched chain alkylene having 2 to 8 carbon atoms, and dialkylene thioether, ⟨alkylene-S-alkylene⟩, wherein the alkylene groups possess 2 to 4 carbon atoms. Typical examples of R³ are

—CH₂CH₂CH₂CH₂—

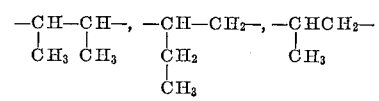

and

—CH₂CH₂SCH₂CH₂—

III. Glycol prepolymer:

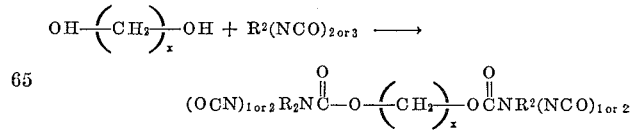

wherein *x* has a value of from 2 to about 6 and R² has the meaning given above.

The above generally defined "block" polymers or prepolymers are well known to those skilled in the art and may be prepared by any one of several known methods. Specific examples of particularly applicable prepolymers are—

(I)

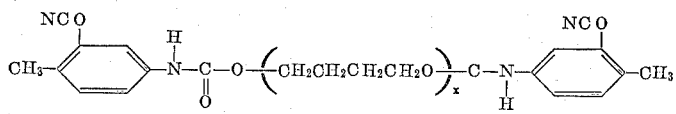

(II)

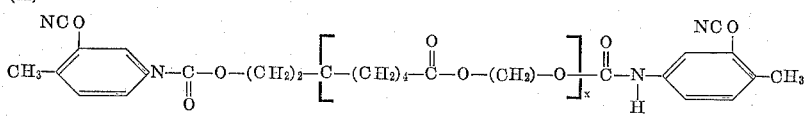

(I)

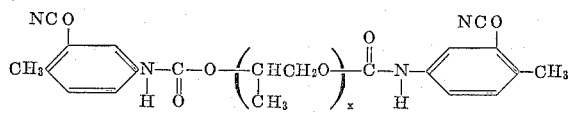

wherein the above prepolymers have an average molecular weight of about 2,000 and $x$ is so adjusted to give this value.

In the practice of the present invention the above prepolymers are reacted with a polyhydroxy tertiary amine to achieve the desired degree of chain extension and to insert basic substituents in the polymeric chain. In general the desired polyhydroxy tertiary amine comprise both di- and tri-hydroxy amines having the general formulae:

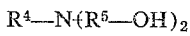

and

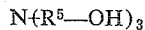

In the above formulae $R^4$ may be alkyl having 1 to 25 carbon atoms and cycloalkyl. Typical examples of $R^5$ are methyl, n-butyl, t-butyl, dodecyl, and hexadecyl. $R^5$ represents alkylene having 1 to 25 carbon atoms, and polyalkyleneoxyalkylene, -(alkylene-O-)$_x$-alkylene-, wherein the alkylene substituents possess 1 to 4 carbon atoms and $x$ has a value of from 1 to about 25. Typical examples of suitable tertiary amine polyols are methyldiethanolamine, cyclohexyldiethanolamine, triethanolamine, t-butyldiethanolamine, octadecyldimethanolamine, hexadecyldipropanolamine, and so forth. Suitable amines falling within the above broad description may also further be characterized by possessing a pK constant of from about 3 to about 6 as measured in aqueous solution.

In general, sufficient polyhydroxy tertiary amine is added or inserted in the polymer so as to impart at least about 0.1 percent by weight tertiary amino nitrogen in the polymeric chain. For extended emulsion stability it is sometimes preferred to increase the t-amino nitrogen up to as much as 5% by weight of the polymer. The ratio of di-hydroxy to tri-hydroxy tertiary amine used is not particularly critical so far as altering the emulsification properties of the final polyurethane product. However, as well known in prior art the use of tri-hydroxy amines will produce an increased amount of crosslinking in this polymeric chain. Therefore, the relative amount of di-hydroxy in tri-hydroxy tertiary amine used is dependent on the properties desired in the final polymeric material.

As a preferred partice equivalent amounts of isocyanate and polyol are used in the present chain-extension step, however, a slight excess of either the polyol or isocyanate reactant will not detract from the quality or usefulness of the end product.

In the preferred practice of the preesnt invention the chain extension reaction, that is the reaction of the polyhydroxy tertiary amine with the prepolymer, is conducted in the presence of an inert solvent. The inert solvent reduces the overall viscosity of the reaction mixture and permits convenient handling thereof. Suitable inert solvents are toluene, benzene, xylene and heptane.

The chain extension reaction will frequently take place at a satisfactory rate at about room temperature. However, the rate of the reaction is largely dependent on the characteristics of the reactants involved. Therefore, reaction temperatures ranging from about room temperature up to about 100° C. may be used to advantage if the nature of the reactants so require. Ordinarily reaction times of from about 60 to about 180 minutes are required to obtain the desired amount of chain extension using the above reaction temperatures and the reactive species generally contemplated herein.

A slightly different procedure for obtaining the tertiary amino substituted polyurethanes used in the practice of the present invention involves forming a hydroxyl terminated polyester using a polyol tertiary amine as at least part of the polyhydroxy reactant. The resulant tertiary amine containing polyester may then be terminated using polyisocyanates and subsequently extended in the normal manner using polyfunctional amines or alcohols. This procedure is summarized by the following equation whereing the meaning of R, $R^2$, $R^4$, and $R^5$ are the same as given previously.

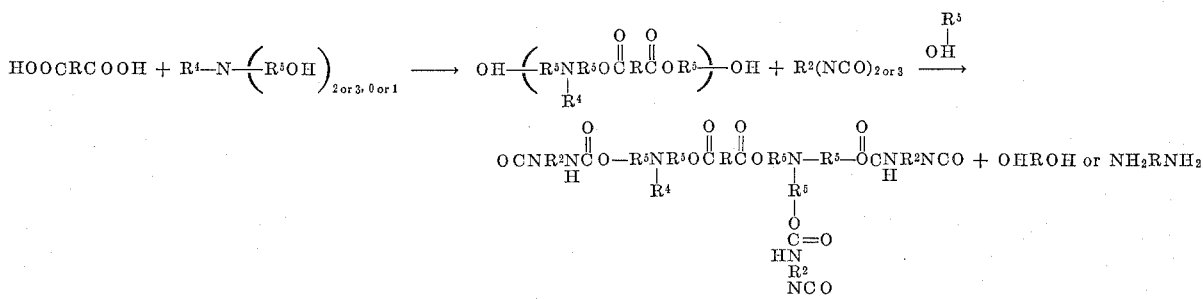

The condensation of the tertiary amine polyol with the difunctional acid as illustrated above is normally conducted in the presence of an ordinary polyol. The amount of tertiary amine polyol used is that amount which is impart from about 0.1 to about 5% by weight of tertiary amino nitrogen in the finished polymer.

The condensation is conducted at a temperature of from about 130° to 250° C. under an inert atmosphere. The reaction with isocyanate is then carried out at from about 30 to 100° C. For the purpose of the present invention this procedure yields a product which is quite similar to that obtained by the extending of ordinary polyester isocyanates with tertiary amine polyols as previously described.

Once the extended polyurethane containing tertiary amine groups is obtained, it is reacted with an acid substance which converts the tertiary amino groups to the corresponding salt and renders the polyurethane chain emulsifiable in water.

Typical acids are:
(1) Organic carbocyclic acids of the general formula $$R^6COOH$$

wherein $R^6$ represents hydrogen or alkyl groups having 1 to 4 carbon atoms.

(2) Inorganic acids such as HX wherein X represents halogen including chlorine, bromine, iodine, fluorine and nitrate; $H_2Y$ wherein Y represents sulfate and carbonate; and $H_3Z$ wherein Z represents phosphate.

In the neutralization step it is preferable to use an amount of acid which will substantially neutralize the tertiary amine groups in the polymeric chain. If desired, however, an excess or slight deficiency of acid may be used without deleterious effects.

The acid is preferably and conveniently incorporated by admixing the extended prepolymer (which contains tertiary amino groups) with an aqueous solution of the desired acidic materials. Generally this addition of the acidic material is done under conditions of vigorous agitation and over a temperature range ranging from about 25 to about 45° C. Using these generally defined temperatures and a relatively vigorous agitation condition from about 3 to about 5 minutes are required for substantial neutralization of the tertiary amino groups and simultaneous emulsification of the polymer.

Upon the addition of the aqueous acidic solution, a stable aqueous emulsion of the extended polyurethane with water is formed. It is found that aqueous emulsions containing up to about 60 percent by weight of the extended polymer which may be readily obtained.

POLYHYDROXY ALCOHOLS

The polyhydroxy alcohols which are used in the practice of the present invention are polyhydroxy aliphatic derivatives which possess the following general formula:

$$R—(OH)_x$$

In the above formula $x$ may have a value of 2 to about 6, and R may represent alkylene radicals of the formula:

wherein $n$ has a value of from 2 to about 8, as well as polyvalent radicals of the general formula:

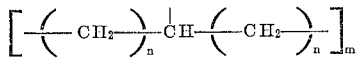

wherein $n$ has a value of from about 1 to 4 and $m$ has a value of from 1 to about 3.

Typical species of polyhydric alcohols which are suitable for the practice of the present invention are glycerine, ethylene glycol, propylene glycol, sugars, in general, non-ionic water soluble polyhydroxy compounds.

MIXING PROCEDURE

The above emulsifiable polyurethane resin, polyhydric alcohol and water are admixed in the range of ratios as set forth above. The mixing is preferably carried out in high speed mixing device which subjects the ingredients to considerable mechanical shearing force. High speed mixing is conducted for a period sufficient to produce a stable emulsion which contains at least 45% polyurethane particles in the below 10.0 micron range. It is found that emulsions of this type possess inherent stability which enables them to be stored over extended periods.

USE OF COMPOSITIONS

The above emulsions are used in forming coatings and films in the conventional manner. For example, the coatings may be brushed, sprayed or knifed on the article to be coated, or the coatings may be applied to a smooth surface from which they may be subsequently stripped to form a self-supporting film. In general, it is found that when the above compositions are used as coating compositions for flexible substrates, such as cloth, paper or resin-impregnated variations thereof, film thicknesses in the order of from about 0.5 to about 50.0 mils may be readily obtained, when coating compositions having viscosities in the range of from about 20 to about 1000 centipoises are used.

Subsequent to deposition of the coating, drying is readily effected at room temperature or above. In general, drying temperatures on the order of from about 25 to about 100° C. may be used. The time required for drying depends on factors such as temperature used and the relative humidity of the surrounding atmosphere.

Upon drying, the above films form a tough cohesive coating which will tenaciously adhere to a wide variety of materials. Material coated may be a cloth or non-woven substarate formed from natural cellulose fibers such as cotton, jute or hemp; modified cellulose fibers such as cyanoethylated cellulose; and common synthetic textile fibers such as rayon, nylon, polyester, polyolefin as well as numerous naturally occurring fibers such as wool and silk.

Subsequent to deposition of the film and drying, the film is solvent extracted, preferably with water, to remove the polyhydric alcohol therefrom and obtain a film which possesses considerable vapor permeability. The solvent extraction is preferably carried out at a temperature of from about ambient to about 100° C. The time required to effect the solvent extraction ranges from about 1 to about 20 minutes, depending on the film thickness, the type of substrate being acted upon, and the temperature used. While water is the preferred extracting agent, it is understood that other water soluble solvents for polyhydroxy alcohols, such as diglyme, monoglyme, etc. and ethanol may be present in varying amounts is desired.

The laminate prior to the extraction of the polyhydric alcohol possesses a vapor permeability substantially the same as a non-modified polyurethane coating. However, upon extraction with a suitable solvent, it is found that the moisture permeabilities increase by 1–5 fold. As a general rule, it is found that films and coatings of the resin compositions properly extracted will possess a vapor transmission rate of from about 500 gms./100 m.²/24 hr. to about 4000 gms./100 m.²/24 hr. depending on the specific composition used to form the film and the substrate upon which it is placed. While the primary purpose or use of the present composition is for coatings of flexible substrate materials or rigid structures of wood, and so forth, it is to be understood that self-supporting films may be prepared from the present compositions which find uses as vapor permeable membranes. Generally, membranes ranging from about 1 to about 50 mils in thickness may be readily prepared by deposition of the present composition upon a smooth plate, drying and extraction of the film, and stripping of the film from the plate. Glass and highly polished stainless steel plates are an ideal surface for preparation of such films.

Having broadly descrbied the basic aspects of the present invention, the following examples are given to illustrate specific embodiments thereof:

*Example I*

400 parts of Witco P–611 polyester based urethane prepolymer was chain extended with 30 parts of t-butyl diethanol-amine and 9 parts of triethanolamine to a viscosity of 150,000 cps. The chain extended material was emulsified with 375 parts of water and 16 parts of acetic acid.

A 7 mil film of this emulsion was coated on paper sheet.

*Example II*

100 parts of the emulsion of Example I was mixed with 5 parts of glycerin and a 7 mil film was cast on the same base. After drying in air overnight the film was leached for two minutes with water of ambient temperature. The sheet was then air dried overnight. A comparison of the permeability of this sheet with the sheet of Example I is given below.

| Sheet: | Transmission rate (g./100 m.²/24 hr.) |
|---|---|
| Uncoated | 2,850 |
| Coated (Example I) | 489 |
| Coated (Example II) | 1,880 |

Example III

Clear 10 mil films were cast from the glycerin treated emulsion of Example II. When dry, each was leached for a given period of time with water at room temperature. The water was analyzed for percent glycerin extracted and the permeability of the film measured. The results are tabulated below.

| Extraction Time (min.) | Glycerine Extracted (percent) | Transmission Rate (g./100 m.²/hr.) |
|---|---|---|
| 1 | 30 | 880 |
| 2 | 50 | 1,760 |
| 5 | 55 | 1,900 |
| 10 | 90 | 2,600 |

The above specific examples clearly indicate that highly useful coatings and films may be obtained using the teachings of the present invention.

We claim:

1. A polyurethane latex composition comprising:
   (1) a polyurethane polymer characterized by containing at least 0.1% by weight of tertiary amino nitrogen, said tertiary amino nitrogen being substantially neutralized with an acid, and,
   (2) from about 1 to about 20 parts by weight of a polyhydroxy compound having the formula $$R\text{—}(OH)_x$$

wherein $x$ has a value of from 2 to 6 and R is selected from the group consisting of

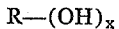

and

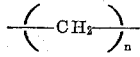

wherein $n$ has a value of from about 1 to 4 and $m$ has a value of from about 1 to 3.

2. The composition of claim 1, wherein the polyhydric alcohol is glycerol.

3. The composition of claim 1 wherein the polyhydric alcohol is ethylene glycol.

4. A method for preparing polyurethane films having a high degree of moisture permeability which comprises:
   (1) forming a film of a water emulsion of a polyurethane resin characterized by containing at least about 0.1% by weight of tertiary amino nitrogens, said tertiary amino nitrogen being substantially neutralized with an acid, having from about 1 to 20 parts by weight of a polyhydroxy alcohol having the formula $$R(OH)_x$$

wherein $x$ has a value of from 2 to 6 and R is selected from the group consisting of

and

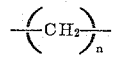

wherein $n$ has a value of from about 1 to 4 and $m$ has a value of from about 1 to 3 dissolved therein, and
   (2) drying said film to provide a continuous solid polymeric film, and
   (3) extracting the polyhydric alcohol from said film to obtain a moisture permeable structure.

5. The method of claim 4 wherein the alcohol is glycerol.

6. The method of claim 4 wherein the alcohol is ethylene glycol.

7. A method for preparing a moisture permeable polyurethane coated flexible sheet material, which comprises coating a flexible substrate with a composition of claim 1, drying said coating to obtain continuous substantially solid polymeric film on said substrate, and extracting said film with water to remove the polyhydric alcohol therefrom and form a moisture permeable film.

8. The method of claim 7, wherein said substrate is a woven fabric.

9. The method of claim 7 wherein the said substrate is a non-woven sheet.

10. The moisture permeable polyurethane coated sheet material prepared in accordance with claim 8.

References Cited by the Examiner

UNITED STATES PATENTS

| 2,968,575 | 1/1961 | Mallonee | 260—29.2 |
| 3,036,998 | 5/1962 | Rudner | 260—77.5 |
| 3,169,885 | 2/1965 | Golodner et al. | 260—29.2 |
| 3,178,310 | 4/1965 | Berger et al. | 260—29.2 |

MURRAY TILLMAN, *Primary Examiner.*

J. C. BLEUTGE, *Assistant Examiner.*